United States Patent [19]
Fabricius

[11] 3,952,189
[45] Apr. 20, 1976

[54] COMPLEX ANALOG WAVEFORM GENERATOR

[75] Inventor: Wayne Nixon Fabricius, Freehold, N.J.

[73] Assignee: Bell Telephone Laboratories, Incorporated, Murray Hill, N.J.

[22] Filed: Feb. 27, 1975

[21] Appl. No.: 553,510

[52] U.S. Cl............................ 235/197; 235/150.53; 328/14
[51] Int. Cl.²...................... G06F 15/34 G06G/7/28
[58] Field of Search...................................... 235/197, 235/150.53, 152, 156, ; 328/14; 324/77 R, 77 A, 77 B, 73 R, 73 AT; 325/41, 42, 133, 134

[56] References Cited
UNITED STATES PATENTS

| | | | |
|---|---|---|---|
| 3,529,138 | 9/1970 | Andre et al........................ | 235/197 |
| 3,544,906 | 12/1970 | Dulaney et al...................... | 328/14 |
| 3,654,450 | 4/1972 | Webb................................ | 235/197 |
| 3,801,807 | 4/1974 | Condon............................. | 235/197 |
| 3,838,414 | 9/1974 | Wiles................................ | 328/14 X |
| 3,845,395 | 10/1974 | Murphree........................... | 328/14 |

*Primary Examiner*—Joseph F. Ruggiero
*Attorney, Agent, or Firm*—John F. Moran

[57] ABSTRACT

A signal generator digitally synthesizes a complex analog signal which has a frequency domain representation including a precise low-frequency offset for each spectral component. The complex analog signal is particularly adapted to increase the accuracy and reliability of a conventional ratio measurement technique. This ratio measurement technique provides a single number rating which is the comprehensive measure of the fidelity of a transmission channel. The complex analog signal is thoroughly compensated for a number of effects. The transfer response of filters and fundamental sources of spectral distortion inherent to digital synthesis, such as aperture effect and quantizing distortion, are items for which compensation is provided. The signal generator has complementary circuitry which conveniently assists to provide desirable odd half-wave symmetry in the analog signal and reduces by one-half the number of stored code words from which the signal is derived.

6 Claims, 11 Drawing Figures

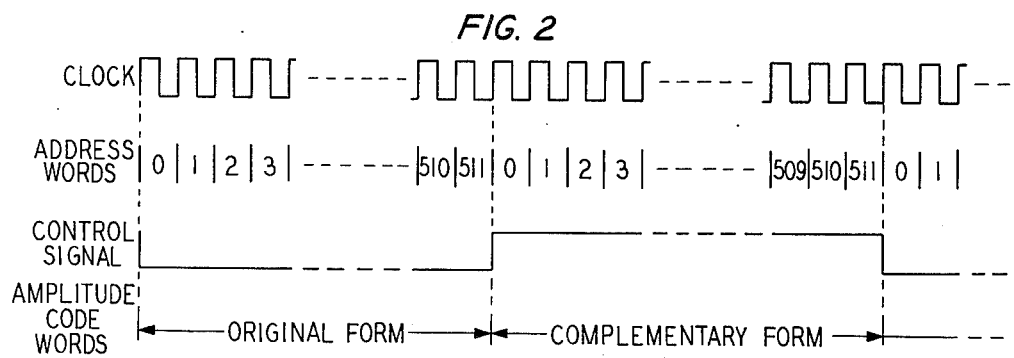
FIG. 2
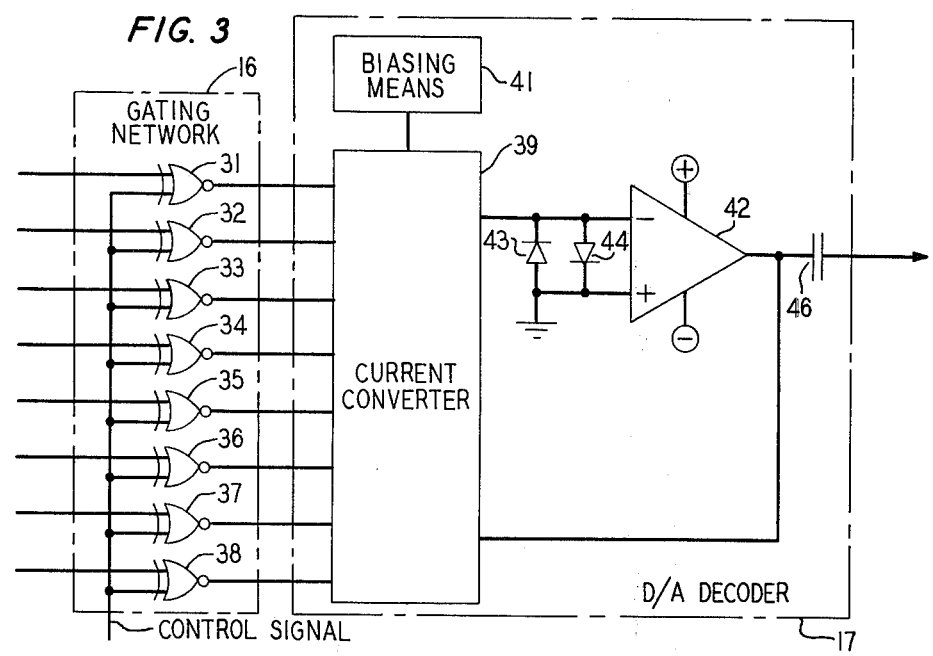
FIG. 3
FIG. 4
| OBJECTIVE OLD P/AR TEST SPECTRUM | | |
|---|---|---|
| FREQUENCY Hz | AMPLITUDE DB | PHASE DEG |
| 126.5 | −80.26 | 0.00 |
| 379.5 | −38.63 | 0.00 |
| 632.5 | −25.84 | 0.00 |
| 885.5 | −16.54 | 0.00 |
| 1138.5 | −9.03 | 0.00 |
| 1391.5 | −3.09 | 0.00 |
| 1644.5 | 0.00 | 0.00 |
| 1897.5 | −1.15 | 0.00 |
| 2150.5 | −5.74 | 0.00 |
| 2403.5 | −11.72 | 0.00 |
| 2656.5 | −17.86 | 0.00 |
| 2909.5 | −23.73 | 0.00 |
| 3162.5 | −29.32 | 0.00 |
| 3415.5 | −34.68 | 0.00 |
| 3668.5 | −45.27 | 0.00 |
| 3921.5 | −50.87 | 0.00 |

FIG. 5

| SPECTRAL COMPONENTS | TEST SPECTRUM | | LINE SPECTRUM | | MEMORY SPECTRUM | | TRANSMITTER | | RECEIVER | |
|---|---|---|---|---|---|---|---|---|---|---|
| FREQUENCY Hz | AMPLITUDE DB | PHASE DEG | AMPLITUDE DB | PHASE DEG | AMPLITUDE DB | PHASE DEG | LOSS DB | PHASE DEG | LOSS DB | PHASE DEG |
| 140.625 | -74.780 | 0.0 | -33.737 | -173.73 | -33.984 | -169.71 | 0.001 | -4.03 | 50.498 | 173.73 |
| 390.625 | -37.945 | 0.0 | -15.881 | -161.24 | -16.121 | -150.04 | 0.009 | -11.21 | 31.518 | 161.24 |
| 640.625 | -25.478 | 0.0 | -14.556 | -143.95 | -14.782 | -125.51 | 0.023 | -18.43 | 20.377 | 143.95 |
| 890.625 | -16.355 | 0.0 | -15.181 | -114.31 | -15.385 | -88.58 | 0.045 | -25.74 | 10.629 | 114.31 |
| 1140.625 | -8.960 | 0.0 | -16.303 | -55.37 | -16.476 | -22.21 | 0.075 | -33.16 | 2.112 | 55.37 |
| 1390.625 | -3.092 | 0.0 | -11.937 | 30.19 | -12.069 | 70.94 | 0.116 | -40.75 | 0.610 | -30.19 |
| 1640.625 | 0.0 | 0.0 | -3.961 | 86.41 | -4.038 | 134.96 | 0.171 | -48.55 | 5.493 | -86.41 |
| 1890.625 | -1.050 | 0.0 | 0.000 | 113.78 | 0.000 | 170.40 | 0.249 | -56.62 | 10.505 | -113.78 |
| 2140.625 | -5.503 | 0.0 | -0.438 | 128.62 | -0.329 | -166.36 | 0.358 | -65.02 | 14.520 | -128.62 |
| 2390.625 | -11.390 | 0.0 | -3.104 | 137.78 | -2.838 | -148.44 | 0.515 | -73.78 | 17.741 | -137.78 |
| 2640.625 | -17.459 | 0.0 | -6.512 | 144.00 | -6.022 | -133.09 | 0.738 | -82.91 | 20.402 | -144.00 |
| 2890.625 | -23.289 | 0.0 | -10.082 | 148.52 | -9.281 | -119.10 | 1.050 | -92.38 | 22.662 | -148.52 |
| 3140.625 | -28.828 | 0.0 | -13.658 | 151.95 | -12.435 | -105.94 | 1.472 | -102.10 | 24.625 | -151.95 |
| 3390.625 | -34.146 | 0.0 | -17.240 | 154.67 | -15.467 | -93.42 | 2.022 | -111.92 | 26.361 | -154.67 |
| 3640.625 | -39.355 | 0.0 | -20.892 | 156.87 | -18.433 | -81.50 | 2.707 | -121.63 | 27.917 | -156.87 |
| 3890.625 | -44.597 | 0.0 | -24.722 | 158.70 | -21.445 | -70.27 | 3.526 | -131.03 | 29.330 | -158.70 |

FIG. 7

SIGNAL MEMORY 13 CODEWORDS EXPRESSED IN OCTAL NOTATION

| | 0 | 1 | 2 | 3 | 4 | 5 | 6 | 7 | 10 | 11 | 12 | 13 | 14 | 15 | 16 | 17 |
|---|---|---|---|---|---|---|---|---|---|---|---|---|---|---|---|---|
| 0 | 201 | 200 | 200 | 201 | 201 | 176 | 175 | 177 | 202 | 204 | 207 | 213 | 211 | 177 | 164 | 155 |
| 20 | 155 | 170 | 221 | 261 | 305 | 271 | 220 | 124 | 33 | 11 | 100 | 255 | 372 | 336 | 156 | 22 |
| 40 | 25 | 136 | 240 | 265 | 250 | 223 | 176 | 160 | 160 | 173 | 206 | 212 | 211 | 210 | 205 | 177 |
| 60 | 175 | 177 | 201 | 200 | 200 | 202 | 202 | 200 | 177 | 200 | 200 | 177 | 177 | 200 | 200 | 176 |
| 100 | 175 | 176 | 177 | 176 | 177 | 201 | 201 | 176 | 173 | 172 | 167 | 166 | 173 | 205 | 216 | 220 |
| 120 | 213 | 173 | 140 | 107 | 104 | 140 | 223 | 313 | 360 | 341 | 220 | 50 | 1 | 111 | 300 | 373 |
| 140 | 321 | 173 | 106 | 105 | 135 | 166 | 211 | 222 | 214 | 176 | 165 | 164 | 166 | 171 | 175 | 202 |
| 160 | 203 | 200 | 176 | 177 | 176 | 175 | 176 | 200 | 201 | 177 | 200 | 201 | 200 | 177 | 200 | 202 |
| 200 | 202 | 201 | 201 | 201 | 200 | 176 | 177 | 202 | 205 | 206 | 210 | 207 | 177 | 165 | 160 | 162 |
| 220 | 175 | 220 | 250 | 266 | 251 | 200 | 113 | 37 | 24 | 101 | 241 | 364 | 355 | 207 | 32 | 11 |
| 240 | 124 | 252 | 311 | 266 | 226 | 175 | 156 | 155 | 171 | 207 | 215 | 213 | 207 | 203 | 176 | 173 |
| 260 | 174 | 200 | 200 | 200 | 200 | 201 | 177 | 176 | 176 | 177 | 177 | 176 | 176 | 177 | 176 | 175 |
| 300 | 175 | 177 | 176 | 176 | 200 | 201 | 177 | 173 | 172 | 171 | 171 | 174 | 205 | 215 | 216 | 207 |
| 320 | 171 | 146 | 124 | 123 | 157 | 236 | 315 | 346 | 326 | 221 | 62 | 0 | 62 | 252 | 373 | 340 |
| 340 | 177 | 66 | 61 | 125 | 171 | 216 | 225 | 220 | 200 | 163 | 161 | 167 | 173 | 177 | 204 | 205 |
| 360 | 202 | 177 | 177 | 200 | 177 | 177 | 201 | 202 | 201 | 200 | 201 | 202 | 200 | 200 | 201 | 202 |
| 400 | 201 | 200 | 201 | 200 | 177 | 177 | 202 | 204 | 205 | 204 | 203 | 176 | 177 | 161 | 164 | 177 |
| 420 | 216 | 236 | 247 | 233 | 165 | 106 | 45 | 43 | 114 | 235 | 356 | 367 | 240 | 53 | 2 | 105 |
| 440 | 254 | 335 | 307 | 230 | 166 | 150 | 160 | 165 | 206 | 217 | 214 | 205 | 200 | 174 | 171 | 171 |
| 460 | 175 | 200 | 200 | 177 | 200 | 177 | 175 | 174 | 176 | 177 | 176 | 175 | 177 | 177 | 175 | 175 |
| 500 | 177 | 177 | 177 | 177 | 201 | 200 | 175 | 173 | 172 | 175 | 177 | 205 | 214 | 215 | 205 | 207 |
| 520 | 153 | 140 | 142 | 172 | 244 | 313 | 331 | 304 | 211 | 67 | 2 | 42 | 221 | 362 | 355 | 214 |
| 540 | 56 | 34 | 112 | 175 | 230 | 232 | 224 | 204 | 164 | 160 | 167 | 176 | 203 | 206 | 210 | 205 |
| 560 | 200 | 177 | 200 | 200 | 200 | 201 | 203 | 202 | 200 | 200 | 201 | 201 | 200 | 200 | 201 | 201 |
| 600 | 177 | 177 | 200 | 177 | 176 | 200 | 203 | 204 | 202 | 200 | 175 | 167 | 162 | 165 | 164 | 214 |
| 620 | 226 | 232 | 217 | 157 | 107 | 56 | 64 | 135 | 242 | 350 | 372 | 264 | 100 | 1 | 2 | 243 |
| 640 | 352 | 331 | 233 | 153 | 134 | 141 | 160 | 203 | 217 | 215 | 203 | 174 | 171 | 167 | 171 | 173 |
| 660 | 200 | 200 | 177 | 177 | 177 | 176 | 174 | 175 | 177 | 177 | 176 | 177 | 200 | 177 | 175 | 177 |
| 700 | 200 | 200 | 200 | 200 | 201 | 177 | 174 | 175 | 173 | 202 | 205 | 212 | 214 | 205 | 205 | 157 |
| 720 | 153 | 155 | 202 | 243 | 303 | 313 | 261 | 173 | 211 | 7 | 33 | 173 | 345 | 367 | 237 | 61 |
| 740 | 14 | 75 | 202 | 247 | 251 | 232 | 207 | 165 | 164 | 166 | 201 | 207 | 210 | 211 | 207 | 202 |
| 760 | 176 | 177 | 201 | 200 | 200 | 202 | 203 | 201 | 200 | 200 | 201 | 200 | 177 | 200 | 201 | 177 |

COMPLEX ANALOG WAVEFORM GENERATOR

BACKGROUND OF THE INVENTION

This invention relates generally to signal generation apparatus and, more particularly, to apparatus of the type used to generate a specific signal that is used to perform baseband measurements on the fidelity of a transmission system.

There are many existing arrangements for determining the fidelity of transmission systems. All of these arrangements can be readily performed in a laboratory environment, but they are generlly ill-adapted for determining the fidelity of a complete transmission system or even segments therein. One serious drawback of these arragements is that geographically displaced equipment, located at opposite ends of the transmission segment under test, must be electrically coupled together by means other than the transmission link. Furthermore, the results provided through the use of most arrangements are subjective in nature and accordingly require skillful interpretation.

A particularly advantageous technique has been devised that provides a single number rating which is a comprehensive measure of the fidelity of a transmission channel. The rating number is a weighted measure of the effects of envelope delay, gain distortion and noise in the channel. Since the measuring technique is performed at baseband frequencies, the nature of the transmission system is independent of the measurement so that the form of the system can range anywhere from a simple metallic pair to a complex carrier system of the radio frequency or digital type. A further advantage of this technique is that the apparatus required to perform the measurement is exclusively coupled through the portion of transmission system under test.

In the implementation of the foregoing technique, a generator and a receiver are simply connected at opposite ends of the channel being tested. The test signal from the generator is transmitted over a channel and then normalized to its pre-transmission amplitude value by the receiver. The normalized ratio of the peak value to the full-wave average value of the envelope of the normalized test signal provides the single number measure of transmission quality of the channel. In theory, the measured ratio of the peak value to the full-wave average value of the signal envelope can be related to the conventional technique wherein the maximum eye ratio is used to measure the quality of the data signal transmission of circuits. In practice, however, residual transmission impairments, such as harmonic distortion and phase intercept distortion which occur at levels that are generally not detrimental to voice or data transmission, affect the measured ratio to such an extent so as to render conventional apparatus of this type unreliable.

It is, accordingly, a primary object of this invention to introduce a precise low-frequency offset into the frequency domain representation of the test signal to make ratio measurement of the transmitted version of same immune to phase intercept distortion.

It is a related object of the invention to minimize the two principal sources of spectral distortion attendant to digital synthesis, i.e., aperture effect and quantizing distortion, of analog signals.

A further object of the invention is to generate a new test signal which, as nearly as possible, has the same frequency domain spectrum as conventional test signals used in ratio measurement to achieve the same measurement sensitivity without reducing measurement accuracy.

SUMMARY OF THE INVENTION

In its broader aspects, the invention takes the form of apparatus that generates a precisely controlled complex analog waveform which includes means for providing a plurality of digital signals constituting encoded samples of a pulse train, converting means for decoding the digital signals in the code groups to form the pulse train that has a fundamental spectral component and a plurality of higher order spectral components, the spectral components being each offset from a nominal frequency by a prescribed frequency and defining a predetermined frequency spectrum while the nominal frequencies are in harmonic relationship to each other.

In some of its more specific aspects, the means for providing the digital signals of the invention includes accessing means for providing the code groups in a predetermined repetitive sequence and the prescribed frequency has a value that insures that the peak amplitude of at least one of the pulses of the pulse train essentially corresponds to the peak amplitude of the envelope of the pulse train independent of phase intercept distortion being subjected to the pulse train.

In some of its even more specific aspects, the invention provides a test signal for ratio measurement which, in addition to the precise low-frequency offset, includes thorough compensation for all effects encountered in the measurement apparatus occurring from inception to final ratio measurement. Fundamental sources of spectral distortion in the analog test signal, which are aperture effect and quantizing distortion, inherent to digital synthesis are minimized. Two additional sources of distortion are eliminated by predistorting the stored digital signals. The first is produced by lowpass filtering which serves to eliminate sharp transitions in the time response of the constructed analog signal. The second is produced by amplitude shaping performed on the analog signal just prior to ratio measurement. Although both of these filtering operations primarily provide out-of-band signal rejection, the filters also affect the baseband spectral components of the analog signal by altering their phase and amplitude. To offset the effect of filtering on the baseband components, the stored digital signals are optimally predistorted to provide pre-equalization for the filter responses so that the spectrum of the signal used for ratio measurement essentially corresponds to a predetermined ideal spectrum. Therefore, other interim effects affecting the test signal, such as envelope delay, gain distortion and noise introduced during transmission, are readily and cumulatively ascertained by ratio measurement. A further aspect of the invention is that selected analog pulses of opposite polarity are conveniently provided by complementing circuitry thereby reducing the number of required digital signals in store by one-half.

BRIEF DESCRIPTION OF THE DRAWING

FIG. 2 is a timing diagram utilized in the explanation of the operation of divider chain 12 in FIG. 1.

FIG. 3 is a detailed block diagram of converter 14 in FIG. 1.

FIG. 4 is a table which defines the test spectrum of conventional ratio measurement apparatus.

FIG. 5 is a table which lists information pertaining to the frequency spectrum of the new test signal at different points in the block diagram of FIG. 1.

FIG. 7 is a table depicting the contents of signal memory 13 of FIG. 1.

DETAILED DESCRIPTION

Figure 1:
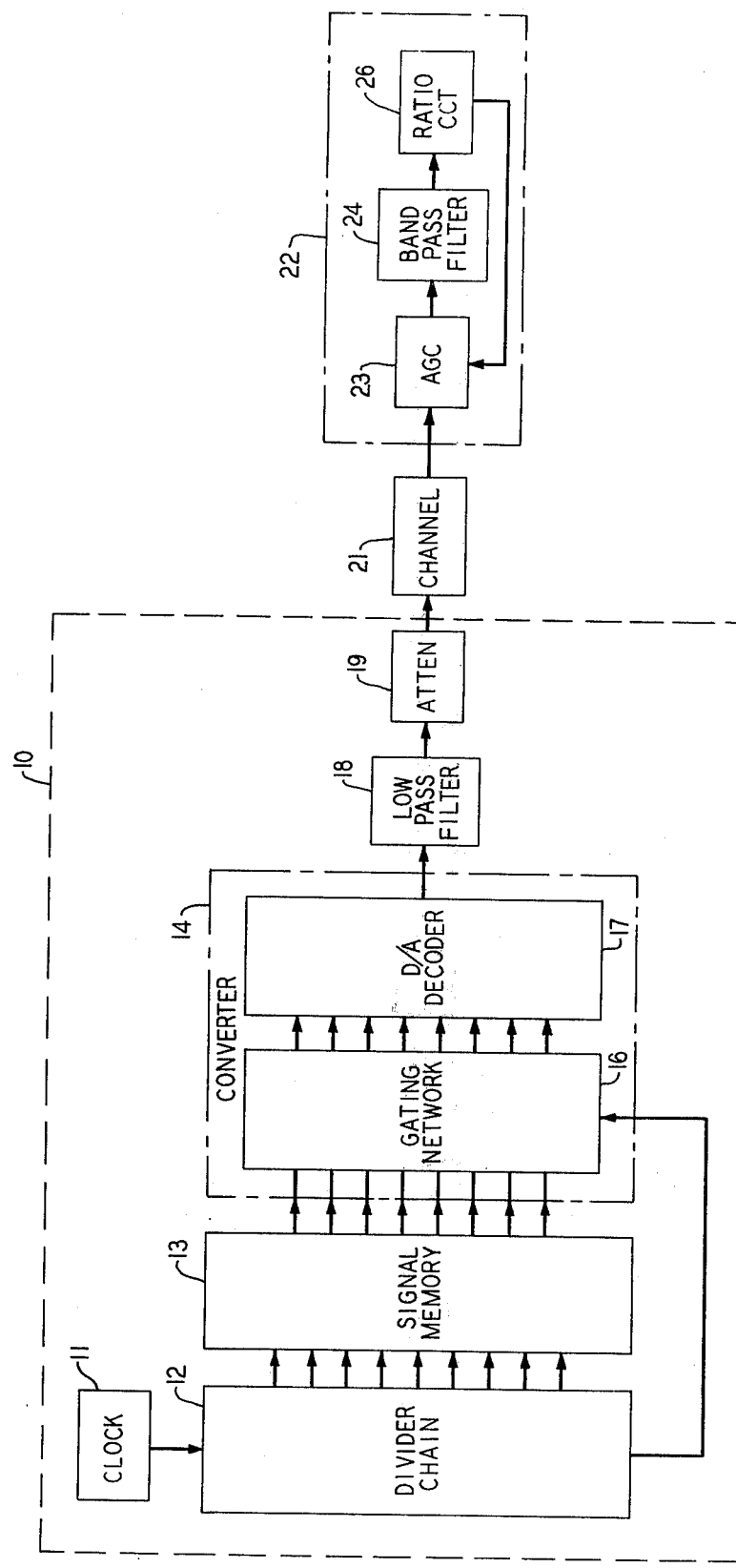
FIG. 1 is a general block diagram of an embodiment of the invention.

In FIG. 1, a signal generator 10 is connected via a transmission channel 21 to a signal receiver 22. Signal generator 10 comprises a clock 11 connected to a divider chain 12 which produces a 9-bit signal for a signal memory 13. Additional information concerning divider chain 12 will be discussed hereinafter in connection with FIG. 2. The 9-bit signal addresses signal memory 13 to gain access to code words contained therein which are indicative of quantized samples of the analog signal being generated. These code words are applied to converter 14 which comprises gating network 16 and D/A (digital-to-analog) decoder 17. Converter 14 produces an analog step signal which is a quantized version of the analog signal being generated. Lowpass filter 18 receives the quantized version of the analog signal and serves to remove the step effect or sharp transitions from the output of converter 14. The smoothed output of filter 18 is applied to attenuator 19 which serves to adjust the amplitude of the analog signal for transmission through channel 21. For the sake of convenience, the signal from filter 18, which is applied to channel 21, will be referred to as the line signal.

The line signal after transmission is applied to receiver 22 wherein the signal passes through serially connected AGC (automatic gain control) circuit 23 and bandpass filter 24 to ratio circuit 26. AGC circuit 23 receives a full-wave rectified average version of the signal applied to ratio circuit 26. AGC circuit 23 adjusts its gain so that the amplitude of the signal from ratio circuit 26 corresponds to a predetermined value. Filter 24 shapes the spectral response of receiver 22 and serves to reject out-of-band signals from application to ratio circuit 26. Ratio circuit 26 performs a ratio measurement to provide a digital indication of P/AR (peak-to-average ratio) which is computed by $$P/AR = 100 \left[ 2 \frac{E \text{ (peak)}}{E \text{ (fwa)}} - 1 \right] \qquad (1)$$

where

E (peak) = normalized peak value of the envelope of the analog pulse signal.

E (fwa) = normalized full-wave rectified average value of the envelope of the analog pulse signal.

In this case, the peak detecting which occurs in ratio circuit 26 is an absolute detector, i.e., both positive and negative peaks of the signal applied to the ratio circuit are used. For convenience, the signal applied to ratio circuit 26 will be referred to as the test signal. In this case, the measured ratio of the test signal in accordance with Equation (1) provides a comprehensive measure of the fidelity of transmission channel 21. Receiver 22 itself constitutes no part of the present invention, other than the compensation provided therefor, and it will be obvious to those skilled in the art that the inventive concepts disclosed herein can be used with other and different signal receivers. Detailed information concerning the internal circuitry of ratio circuit 26 is readily available. For example, U.S. Pat. No. 3,502,983, issued to J. F. Ingle et al. on Mar. 24, 1970, and U.S. Pat. No. 3,752,972, issued to L. W. Campbell, Jr. on Aug. 14, 1973, disclose such information.

FIG. 2 depicts a timing relationship between the output of clock 11 and the two outputs of divider chain 12. The upper line of FIG. 2 illustrates the clock signal which is generated by clock 11. The second line of FIG. 2 is a decimal representation of the 9-bit address words produced by divider chain 12 during each period of the clock signal. For example, the address word depicted by the decimal number 3 represents the binary word of 000000011 in the 9-bit output from divider chain 12. The internal circuitry of divider chain 12 comprises conventional circuitry such as two synchronous 4-bit binary counters being driven by clock 11 and arranged in a well-known manner to provide a repetitive 9-bit binary code as the output signal.

Divider chain 12 can be thought of as scanning the code words contained in signal memory 13 so that the memory sequentially produces a series of binary words representing quantized amplitude samples of the signal being generated. After the completion of one scan by divider chain 12, the control signal produced by divider chain 12 and applied to gating network 16 of converter 14 changes state. The new state is maintained as divider chain 12 completes another scan. During this scan, the digital words contained in signal memory 13 are used to derive complementary digital words from gating network 16. These complementary words are then applied to D/A decoder 17. In this manner, odd symmetry is conveiently produced in the signal being generated and the required capacity of signal memory 13 is reduced by one-half. Signal memory 13 is a storage device which may be realized by a read only memory or other equivalent means. The operation of read only memories and design criteria to be considered in the utilization of them appears in an article entitled "There is a Read-Only Memory to Fill Your Needs" by J. Marino and J. Sirota at p. 112 of the Mar. 16, 1970 issue of *Electronics* magazine (Vol. No. 43, No. 6), published by McGraw-Hill. Read only memories made in accordance with the specified content which is listed hereinafter in FIG. 7 are commercially available from Monolithic Memories, Inc., of Sunnyvale, California or others.

FIG. 3 illustrates further details of converter 14 in FIG. 1. In converter 14 of FIG. 3, gating network 16 comprises exclusive OR gates 31 through 38 which individually receive one output signal from signal memory 13 and the control signal from divider chain 12. The operation of gates 31 through 38 can best be understood by reference to the timing diagram of FIG. 2. In FIG. 2 as counter chain 12 issues a first sequence of address words 0 through 511 which scans the contents of memory 13, the level of the control signal is kept low. Therefore, the amplitude code words from memory 13 corresponding to the first sequence of address words simply pass on to D/A decoder 17 via gating network 16. During the next sequence of address words which again scans the contents of memory 13, the level of the control signal is switched to a high or logical 1 level. The new level of the control signal now results in gates 31 through 38 of gating network 16 passing the binary complement of the coded amplitude words obtained from memory 13 to D/A decoder 17.

D/A decoder 17 comprises current converter 39 and bias means 41 which serve to convert the amplitude code words provided by gating network 16 into an analog current. It should be noted that the gates of network 16 provide both the original code words and complementary code words which are decoded into appropriate values of analog current by current converter 39. This decoding characteristic of converter 39 contributes to the generation of an analog signal with odd half-wave symmetry. That is half-wave portions of the analog signal would be symmetrical to each other but for a reversal in polarity. Since the analog signal includes polarity reversals at one-half wave intervals, ratio measurement based upon this signal is independent of the polarity of connections in coupling the measurement apparatus together through a transmission channel. Current converter 39 may typically comprise two monolithic integrated circuit chips connected together in a well-known manner. One chip provides a precision voltage reference plus a plurality of weighted current sources which are switched to supply a variable current. The second chip provides a precision thin-film ladder network, tracking feedback resistor and bipolar source resistor. The DAC 100 made commercially by Precision Monolithics, Inc., of Santa Clara, California is an integrated circuit which may be utilized as current converter 39. The analog current is applied to differential amplifier 42 wich has its inputs shunted by oppositely poled diodes 43 and 44. Amplifier 42 transforms the analog current into a positve analog voltage.

There are advantages of only decoding positive voltages and then using blocking capacitor 46 to remove the direct current component so that the signal is symmetrical about zero volts. In this arrangement, biasing means 41 is only required to supply a positive bias to current converter 39. Equally important is that signal memory 13 is not required to have the additional capacity of storing a sign bit for each encoded amplitude sample. This reduction in the required capacity of signal memory 13 is in addition to the saving of one-half afforded by the operation of gating network 16 and converter 17 to provide the odd half-wave symmetry in the analog line signal applied to channel 21.

The process will now be described wherein the values of the encoded amplitude samples are determined. Substantially the same frequency test spectrum for ratio measurement is synthesized by the new digital equipment as the test spectrum that was produced by the prior art analog equipment. The new ratio measurement equipment therefore has the same measurement sensitivity to envelope delay as the conventional equipment so that there is a correlation of testing data. However, the digital equipment produces a test signal spectrum that is altered to a nonsubstantial degree which is sufficient to insure that it does not suffer from the drawbacks of the conventional apparatus.

The old test spectrum is roughly defined by fourteen different frequency components each having an amplitude and phase value relative to the spectral component of 1644.5 Hz. FIG. 4 is a table listing the frequency components and the respective amplitude and phase values. The analog technique used in the prior art to obtain the signal that eventually provides the test spectrum is generated by utilizing the impulse response of a filter. In actuality, there are more frequency components in the signal than those listed in FIG. 4. As a practical matter, however, the shape of the amplitude versus frequency curve or the frequency domain envelope of the measurement is of greater importance than the particular frequencies or points used to define the overall shape of the curve or envelope. Analytically, a test signal where the amplitude of the spectral components corresponds to the frequency domain envelope may be represented by the following Fourier series:

$$s(t) = \sum_{I=1}^{16} A(I) \cos[2\pi(FI + (I-1)FINC)t + B(I)] \quad (2)$$

where $A(I)$ = Amplitude of the $I^{th}$ frequency component $I = 1, \ldots 16$ (Frequency components of the spectrum)

$FI$ = Fundamental baseband frequency component $FINC$ = Frequency increment between adjacent frequency components $B(I)$ = Phase of the $I^{th}$ frequency component In an article in the *IEEE Transactions on Communications Technology*, Vol. COM-18, No. 2, April 1970 entitled "The PAR Meter: Characteristics of a New Voiceband Rating System," pages 147–153 by Loran W. Campbell, Jr., it was demonstrated that the peak value of $s(t)$ was highly dependent on $\phi$, phase intercept distortion, and $\omega_x$, frequency shift. This dependence is illustrated by:

$$s_x(t) = \sum_{I=1}^{16} A(I) \cos[2\pi(FI + (I-1) FINC)t + \phi + \omega_x t] \quad (3)$$

In addition, the full-wave rectified value of $s_x(t)$ varies when subjected to $\phi$ and/or $\omega_x t$, but the variation is to a lesser extent than the peak value of $s(t)$. Since phase intercept distortion and frequency shift are commonly found to be residual transmission impairments of transmission systems which do not affect voice and/or data transmission, the effect of these impairments on P/AR measurement cannot be tolerated.

From the theory of analytical signals, it can be shown as demonstrated in the appendix of the Campbell article that the mathematical representation of the envelope of $s_x(t)$ is invariant to the presence of phase intercept distortion and frequency shift. The envelope $e(t)$ of an arbitrary real time signal $s(t)$ is defined as the absolute value of the analytical signal $Z(t)$. $Z(t)$ equals $s(t)$ plus $j\hat{s}(t)$ where $\hat{s}(t)$ is the Hilbert transform of $s(t)$. The Hilbert transform and the effect of noise therein is presented in *Communications Systems and Techniques* by Schwartz, Bennett and Stein, Copyright 1966 by McGraw-Hill, Inc., sections 1–6 and 1–7, pages 29–41. Thus, the analytic signal is $$Z(t) = s(t) + j\hat{s}(t). \quad (4)$$

The envelope of $s(t)$ is then defined As:

$$e(t) = |Z(t)| = \sqrt{s^2(t) + \hat{s}^2(t)} \quad (5)$$

Consider $s(t)$ as an arbitrary real time signal that can be described by a truncated Fourier series:

$$s_1(t) = \sum_{n=1}^{M} A_n \cos(n\omega_0 t + \theta_n) \tag{6}$$

where
$\omega_0 = 2\pi f_0$
$f_0$ = fundamental repetition rate of the signal
$A_n$ = amplitude of the $n^{th}$ spectral component
$\theta_n$ = phase of the $n^{th}$ spectral component
$M$ = highest harmonic of $f_0$ to be considered.

With added phase intercept and frequency shift, $s_1(t)$ becomes $$s_2(t) = \sum_{n=1}^{M} A_n \cos(n\omega_0 t + \theta_n + \phi + \omega_x t) \tag{7}$$

where $\phi$ = added phase intercept $\omega_x = 2\pi f_x$ and $f_x$ = frequency shift.

A trigonometric expansion of $\cos(n\omega_0 t + \theta_n + \phi + \omega_x t)$ is $\cos(n\omega_0 t + \theta_n)\cos(\phi + \omega_x t) - \sin(n\omega_0 t + \theta_n)\sin(\phi + \omega_x t)$. Therefore, $$s_2(t) = \cos(\phi + \omega_x t) \sum_{n=1}^{M} A_n \cos(n\omega_0 t + \theta_n)$$
$$- \sin(\phi + \omega_x t) \sum_{n=1}^{M} A_n \sin(n\omega_0 t + \theta_n) \tag{8}$$

$$s_2(t) = \cos(\phi + \omega_x t) s_1(t) - \sin(\phi + \omega_x t) \hat{s}_1(t) \tag{9}$$

where $\hat{s}_1(t)$ is the Hilbert transform of $s_1(t)$. Note that:

$$s_2(t) = \text{Re}\left([s_1(t) + j\hat{s}_1(t)] e^{j(\phi + \omega_x t)}\right)$$

$$s_2(t) = \text{Re}[u(t)e^{j(\phi + \omega_x t)}] = \text{Re}[Z(t)]$$

$Z(t)$ is an analytic signal which is the sum of $s_2(t)$ and $j\hat{s}_2(t)$. Then, the envelope of $s_2(t)$ equals $$|Z(t)| = |u(t)| = [s_1^2(t) + \hat{s}_1^2(t)]^{1/2}$$

$$s(t) = \sum_{I=1}^{16} ATS(I) \cos[2\pi \left(\frac{FI}{FO} + (I-1) \frac{FINC}{FO} + 1\right) FOt] \tag{12}$$

and $Z(t) = u(t)e^{j(\phi + \omega_x t)} = |u(t)| e^{jp} e^{j(\phi + \omega_x t)}$
where $p = \tan^{-1}(\hat{s}_1(t)/s_1(t))$ $$s_2(t) = \text{Re}[Z(t)] = [s_1^2(t) + \hat{s}_1^2(t)]^{1/2} \cdot \tag{10}$$

$$\cos[\phi + \omega_x t + \tan^{-1} \hat{s}_1(t)/s_1(t)].$$

The first factor in Equation (10) is the expression for the envelope of the signal and the second factor is the expression for the structure of the signal under the envelope. Both factors are expressed in the time domain.

It can be observed that the envelope of $s_2(t)$ equals the envelope of $s_1(t)$ and that the envelope is independent of phase intercept and frequency shift whereas the structure beneath the envelope is highly dependent on $\phi$ and $\omega_x t$. Since the maximum value of $s_2(t)$ is the peak value of the envelope, the envelope represents the upper-bound on $s_2(t)$.

It therefore becomes necessary to recover the peak and full-wave average values of the test signal envelope to provide a P/AR measurement which is independent of the pressure of phase intercept distortion. In order to achieve recovery of values of the envelope of the test signal, a precise frequency offset is intentionally introduced into the baseband P/AR spectrum. Then the signal peak and the full-wave average of the actual signal will be very close to the peak and the full-wave average of the envelope of the signal. The degree of accuracy achieved is dependent on the selected value of the frequency offset. Furthermore, if the frequency offset is integrally related to the fundamental frequency of the signal then the overall signal becomes periodic. This is an important feature since periodicity of a digitally synthesized signal means it can be generated by repetitive scanning of a number of amplitude samples without producing a signal containing discontinuities.

Through simulation techniques, it was determined that a frequency offset, FO, of 15.625 Hz, which is an eighth of the fundamental baseband frequency component, FI, would yield a signal peak value within 0.2 percent of the peak envelope value for any arbitrary value of phase intercept distortion. The full-wave average value of the signal, in this case, was within 0.1 percent of the full-wave average value of the envelope of the signal.

A new test signal spectrum corresponding to the shape of the amplitude versus frequency curve as defined in FIG. 4 was devised including FO, the precise frequency offset. FIG. 5 is a multiple table listing the frequency components of the new test signal spectrum on the left side with respective amplitude and phase values. The Fourier series representation of the new test signal is $$s(t) = \sum_{I=1}^{16} ATS(I) \cos[(2\pi(FI + (I-1) FINC)t + 2\pi FOt] \tag{11}$$

where $ATS(I)$ = absolute amplitude of the $I^{th}$ test signal spectral component. If rearranged, Equation (11) may be written as where the values assigned are:
FI = 125 Hz.
FINC = 250 Hz.
FO = 15.625 Hz. and $$\frac{FI}{FO} = 8, \quad \frac{FINC}{FI} = 2, \quad \frac{FINC}{FO} = 16.$$

Equation (12) with substituted values becomes $$s(t) = \sum_{I=1}^{16} ATS(I) \cos[2\pi(9 + 16(I-1)) FOt] \tag{13}$$

Figure 6:
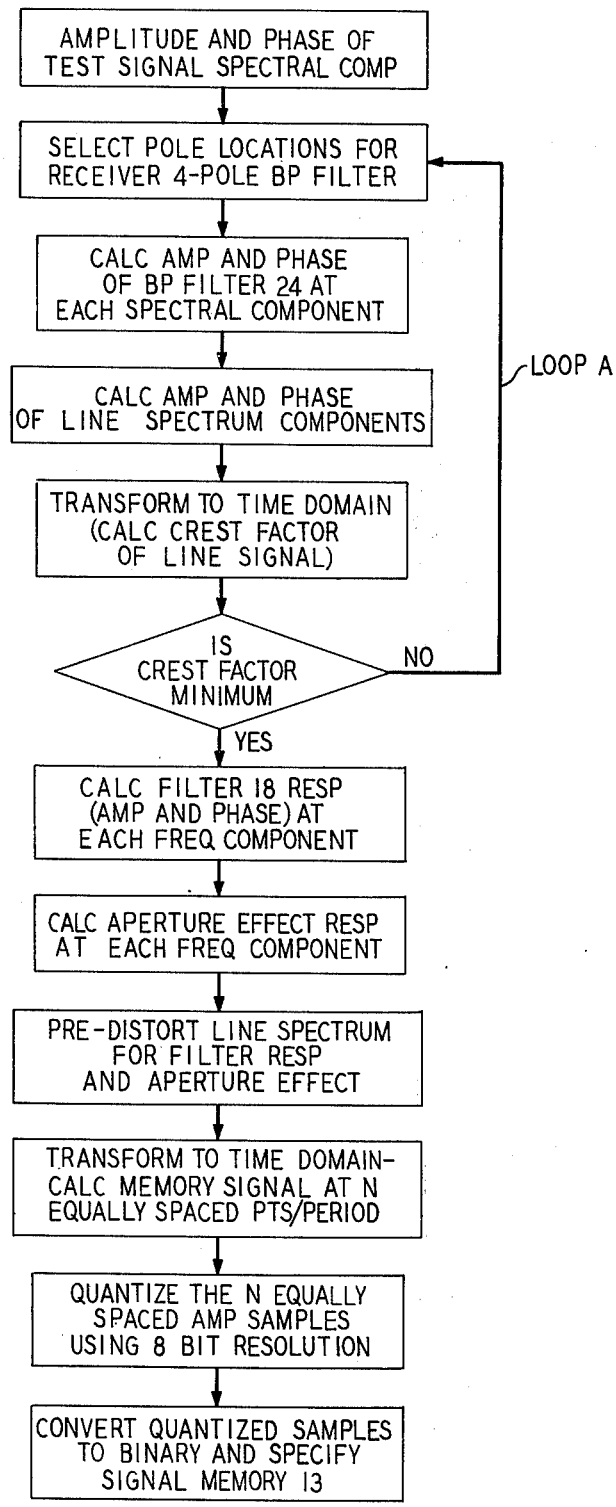
FIG. 6 is a flow chart which serves to illustrate the manner in which the contents of signal memory 13 are determined.

The test spectrum is now defined which is the starting point of the flow chart illustrated in FIG. 6. The development of the discussion with applicable equations, from this point forward, will proceed along the steps indicated in the flow chart of FIG. 6. The next step, as shown in FIG. 6, is to determine the transfer characteristic of filter 24 in FIG. 1 by selection of the four poles therein. A four pole active filter was found adequate to give the desired frequency response characteristic for receiver 22 in FIG. 1. Higher order active filters are conventionally realized by cascading lower order filter sections. The general biquadratic filter section has the following transfer function:

$$T(s) = \frac{n_2 s^2 + n_1 s + n_o}{d_2 s^2 + d_1 s + d_o}. \quad (14)$$

The magnitude of the numerator and denominator are:

$$M_N^2 = (n_o - n_2 \omega^2)^2 + (n_1 \omega)^2 \quad (15)$$

$$M_D^2 = (d_o - d_2 \omega^2)^2 + (d_1 \omega)^2. \quad (16)$$

The magnitude response of the section is:

$$M^2 = \frac{M_N^2}{M_D^2} \quad (17)$$

$$M(\omega) = \sqrt{M^2(\omega)} \quad (18)$$

$$M_{dB} = 20 \log M(\omega) = 10 \log (M^2(\omega)). \quad (19)$$

The phase shift between the output and input of a filter section is:

$$\phi(\omega) = \tan^{-1}\left(\frac{n\omega_1}{n_o - n_2 \omega^2}\right) - \tan^{-1}\left(\frac{d_1 \omega}{d_o - d_2 \omega^2}\right). \quad (20)$$

In the case of filter 24, which comprises two identical second order bandpass filter sections connected in cascade, the bandpass transfer function results when $n_2 = n_o = 0$ in Equation (14). The overall transfer function of filter 24 is expressed as:

$$H(s) = \left[\frac{A_o \alpha \omega_c s}{(s^2 + \alpha \omega_c s + \omega_c^2)}\right]^2 \quad (21)$$

where $\omega_c = 2\pi Fc$ and $Fc$ is center frequency of the pass band $A_o$ = Midband gain $\alpha = 1/Q_o$ and $Q_o$ is the quality factor of the filter. If $j\omega$ is substituted for $s$, the amplitude response of filter 24 is obtained by computing absolute magnitude of $H(j\omega)$. Computation of the amplitude response of filter 24 at the $I^{th}$ spectral component, designated by the term AR(I), is provided by the following Equation:

$$AR(I) = \left[\frac{A_o^2}{[1 + Q_o^2 [F(I)/Fc - Fc/F(I)]^2]}\right]. \quad (22)$$

The phase response for each $I^{th}$ spectral component, BR(I), in radians is obtained by determining the arc tangent of the imaginary to the real part of $H(j\omega)$ as calculated by $$BR(I) = -2\tan^{-1}[Q_o[F(I)/Fc - Fc/F(I)]]. \quad (23)$$

The next step is to determine the line spectrum of the signal which is to be provided at the output of filter 18. The line signal is unaffected by attenuator 19, channel 21 which is presently assumed to be distortionless, and AGC circuit 23. It should be noted that attenuator 19 and AGC circuit 23 are designed to be transparent, i.e., introduce no signal impairments, to provide good performance of the apparatus illustrated in FIG. 1. The line spectrum is computed by dividing the test signal spectrum at each component by the transfer characteristic, i.e., amplitude and phase responses, of filter 24. Therefore, $$ALS(I) = ATS(I)/AR(I) \quad (24)$$

and $$BLS(I) = BTS(I) - BR(I) \quad (25)$$

since BTS(I) is 0 for all values of I then $$BLS(I) = -BR(I) \quad (26)$$

where ALS(I) = absolute amplitude of $I^{th}$ line spectral component and

BR(I) = phase (radians) of $I^{th}$ line spectral component.

The spectral components of the line signal spectrum, which is available at the output of filter 18, are listed in FIG. 5. The time domain representation of the line signal, LS, is $$LS(t) = \sum_{I=1}^{16} ALS(I) \cos[2\pi(9 + 16(I-1)) FOt + BLS(I)]. \quad (27)$$

Amplitude values of line signal, LS, in the time domain at N equally spaced points over one period in relation to the frequency offset, FO, are now required. It should be noted that the period is 64 milliseconds which is simply the reciprocal of FO = 15.625 Hz. For convenience, Equation (27) is modified by letting J denote the $J^{th}$ sample and replacing T by N and $t$ by J. Accordingly, $$LS(J) = \sum_{I=1}^{16} ALS(I) \cos[2\pi(9 + 16(I-1)) \frac{J}{N} + BLS(I)]. \quad (28)$$

The value of N is set at 1024 and then LS(J) is calculated for $J = 1, \ldots N$. However, since LS(t) is selected to exhibit half-wave symmetry then $$LS(t + T/2) = -LS(t), \text{ for } 0 \leq t \leq T/2. \quad (29)$$

Thus, for all values of $t$ between 0 and T/2

$$LS(J + N/2) = -LS(J) \quad (30)$$

for $J = 1, \ldots N/2$.

The peak and rms values of the line signal are calculated from the samples.

It is now time to consider a source of spectral distortion occasioned by digital synthesis, known as quantizing distortion. This is due to the fact that the amplitude samples used to synthesize a continuously variable analog signal are limited to the discrete values of the quantizing steps. In other words, quantizing distortion is a round-off type of error. Quantizing error may conveniently be expressed in terms of the total mean square voltage between the exact value of the analog signal being digitally synthesized and the value of the quantized sample of the analog signal.

Since the type of signal being synthesized is known, the variation between the peak value and its minimum value fall within a predetermined range. It is therefore desirable, in this case, to use uniform spacing, $s$ volts, for the difference between the quantizing levels. Thus, the quantizing error $e$ is bounded by $-s/2 \leq e \leq +s/2$. A fair assumption is that the value of $e$ at any particular instant has equal probability anywhere within this range. In other words, $e$ has a uniform probability density function $p(e) = 1/s$ over $[-s/2, s/2]$. When the numbers of quantizing steps are sufficiently high, adjacent errors become independent from each other and the value of the assumption becomes even more reasonable. The mean-square value of the error can be found by $$\overline{e^2} = \int_{-s/2}^{+s/2} e^2 p(e) de = \int_{-s/2}^{+s/2} e^2/s \, de = \frac{e^3}{3s}\Big|_{-s/2}^{+s/2} = \frac{s^2}{12}. \quad (31)$$

Evaluation of Equation (31) brings to light that the rms error is fixed at $s/\sqrt{12}$ regardless of the instantaneous value of the input signal, $X(t)$. Thus, if $|X(t)|$ is small for extended portions of time in the analog signal, the invariance of the amount of quantizing distortion present causes a considerable reduction in the signal to distortion ratio.

This effect is even more pronounced if the analog signal to be quantized has a large crest factor, $c_f$, which is the ratio of the peak amplitude of the rms value of the analog signal. Since the test spectrum is defined which is subject to the transfer characteristic of filter 24, the most reasonable objective would be to select a transfer characteristic which allows the crest factor to be minimized and the signal to distortion ratio (S/D) to be maximized. The S/D can be computed by determining the rms value, designated $\overline{X^2}$, and $\overline{e^2}$. If the rms quantizing error is fixed at $s/\sqrt{12}$ and the peak-to-peak range of the analog signal spans all $2^n$ quantum levels, the $S/D$ ratio can be expressed as a function of the signal crest factor $c_f$.

$$2X_{peak} = 2^n s \quad (32)$$

$$X_{rms} = 2^n s / 2c_f \quad (33)$$

$$S/D = \frac{\overline{X^2}}{\overline{e^2}} = \frac{(2^n s / 2 c_f)^2}{s^2/12} = \frac{3(2^{2n})}{c_f^2}. \quad (34)$$

Equation (34) expressed in terms of decibels is:

$$S/D|_{dB} = 10 \log \left[ \frac{3(2^{2n})}{c_f^2} \right] \quad (35)$$

$$S/D|_{dB} = 20n \log(2) + 10 \log(3) - 20 \log(c_f) \quad (36)$$

$$S/D|_{dB} \cong 6n + 4.8 - c_{f_{dB}}. \quad (37)$$

Accordingly, S/D is a function of the resolution of the quantizing process and the signal crest factor. A design choice was made to use eight-bit resolution and the parameters of filter 24 were selected using an iterative procedure to minimize the crest factor. This procedure is illustrated by loop A in FIG. 6. For each set of parameters for filter 24, the peak value of the signal was calculated by finding the maximum amplitude and the two adjacent amplitude values, all corresponding to N points of Equation (30), according to Equation (28). A second order interpolating polynominal was fitted to the three points to determine the actual peak value. The final set of parameters corresponding to the minimization of the crest factor was chosen. The parameters consist of a double pole at the complex conjugate pair:

$$P, P^* = \frac{\omega c}{4}(-1 \pm j\sqrt{15}) \text{ with } \omega_c = 2\pi F_c$$

and $F_c = 1300$ Hz. The amplitude and phase of each $I^{th}$ component of the frequency spectrum for the line signal is now established which are respectively designated ALS(I) and BLS(I).

The final steps in the process concern the characteristics of filter 18 and another source of spectral distortion occasioned by digital synthesis known in sampling theory as aperture effect. Aperture effect is an attenuation of the high frequency baseband components produced by the duration of the quantized amplitude samples. These two effects can be combined and termed the transmitter response which is represented by ATMT(I) absolute amplitude of transmitter response for the $I^{th}$ frequency component and BTMT(I) phase response at $I^{th}$ frequency component produced by filter 18. To compensate or pre-equalize for the transmitter response, the amplitude, AM(I), and phase BM(I) of each spectral component used in the calculation of the stored amplitude samples in signal memory 13 are altered so that the transmitter response actually produces the desired line signal spectrum. This is achieved by $$AM(I) = ALS(I)/ATMT(I) \quad (38)$$

$$BM(I) = BLS(I) - BTMT(I). \quad (39)$$

The first step in defining the transmitter response is to characterize filter 18 which comprises two cascaded sections. Again using Equation (14), the first low-pass section results when $n_2 = d_2 = 0$ and the second order low-pass section results when $n_2 = n_1 = 0$. The transfer function of a general third order low-pass filter is:

$$H(s) = \frac{A_1 \omega_1}{(s_1 + \omega_1)} \left[ \frac{A_2 \omega_2^2}{s^2 + \alpha \omega_2 s + \omega_2^2} \right] \quad (40)$$

Since a Butterworth response is used, then $\omega_1 = \omega_2 = \omega_p$, $A_1 = A_2 = A$, and $\alpha = 1$. Thus $$H(s) = \frac{A^2\omega_p^3}{(s+\omega_p)(s^2+\omega_p s+\omega_p^2)}. \quad (41)$$

$$H(s) = \frac{A^2\omega_p^3}{(s^3+2\omega_p s^2+\omega_p^3)}. \quad (42)$$

If $j\omega$ is substituted for $s$ then the amplitude response is obtained by computing $|H(j\omega)|$. The result is the amplitude response of the low-pass filter for the $I^{th}$ spectral component or $$ALP(I) = \frac{A^2}{\sqrt{1+(F(I)/F_p)^6}} \quad (43)$$

where
$\omega_p$ = pole frequency in radians
$\omega_p = 2\pi F_p$ and $F_p = 4,000$ Hz.
$A \cong 1.5$ D.C. gain.
The phase response is $$BLP(I) = \pi/2 - \tan^{-1}[F(I)/F_p] - \tan^{-1}[F(I)/F_p - F_p/F(I)]. \quad (44)$$

The poles selected for filter 18 were a real pole at $P_1 = \omega_p$ and a complex conjugate pole pair at $P_2, P_{2=} = \omega_p/2\ (-1 \pm j\sqrt{3})$ where $\omega_p = 2\pi F_p$ and $F_p$ is 4000 Hz. From sampling theory, the amplitude function introduced by aperture effect is:

$$H(\omega) = \frac{\sin(\pi\omega/\omega s)}{\pi\omega/\omega s} \quad (45)$$

where Fs = sampling frequency of 16 KHz and $\omega_s = 2\pi$Fs. In this case, Equation (45) can be rewritten in reference to each $I^{th}$ spectral component as $$H(I) = \frac{\sin(\pi F(I)/Fs)}{\pi F(I)/Fs}. \quad (46)$$

The total transmitter response is

ATMT(I) = ALP(I) H(I)

$$= \frac{A^2 \frac{\sin(\pi F(I)/Fs)}{\pi F(I)/Fs}}{1+(F(I)/F_p)^6} \quad (47)$$

and

BTMT(F) = BLP(I)

$$= -\frac{\pi}{2} - \tan^{-1}[F(I)/F_p] - \tan^{-1}[F(I)/F_p - F_p/F(I)]. \quad (48)$$

Finally, the amplitude spectrum of the signal to be encoded as the amplitude samples in signal memory 13 can be determined by the following:

$$AM(I) = \frac{ALS(I)}{ATMT(I)} = \frac{ALS(I)}{ALP(I)H(I)} = \frac{ATS(I)}{AR(I)ALP(I)H(I)}. \quad (49)$$

Substitution yields:

$$AM(I) = \frac{ATS()}{\left[\frac{A_o^2}{1+Q_o^2(F(I)/FO-FO/E(I))} \cdot \frac{A^2\sin(\pi F(I)/Fs)/\pi F(I)/Fs}{\sqrt{1+(F(I)/F_p)^6}}\right]} \quad (50)$$

which can be rewritten as $$AM(I) = \frac{ATS(I)[1+Q_o^2(F(I)/F_c - F_c/F(I))^2]\sqrt{1+F(I)/F_p^6}(\pi F(I)/Fs)}{A_o^2 A^2 \sin(\pi F(I)/Fs)} \quad (51)$$

The phase characteristic becomes:

$$BM(I) = BLS(I) - BTMT(I) = -BR(I) - BLP(I) = -(BR(I) + BLP(I)) \quad (52)$$

which rearranged appears as $$BM(I) = 2\tan^{-1}[Q_o(F(I)/F_c - F_c/F(I))] + \pi/2 + \tan^{-1}[F(I)/F_p] + \tan^{-1}[F(I)/F_p - F_p/F(I)]. \quad (53)$$

The signal in memory 13 is calculated at N = 1024 equally spaced time points $$M(J) = \sum_{I=1}^{16} AM(I)\cos[2\pi(9+16(I-1))\frac{J}{N} + BM(I)] \quad (54)$$

where AM(I) and BM(I) are respectively determined in accordance with Equations (51) and (53). From these samples the PEAK value of M(J) is calculated.

Finally, the signal to be stored in memory 13 is ready to be quantized. Eight bit resolution ND = 8 was selected. The number of quantizing levels NQL becomes $2^{nd}$ or 256 levels. The size of the quantizing step, STP, is determined by $$STP = \frac{2(\text{PEAK})}{NQL} = \frac{\text{PEAK}}{128}. \quad (55)$$

The amplitude code words to the nearest quantizing step are determined by $$ICW(J) = \frac{\text{PEAK} + M(J)}{STP}. \quad (56)$$

where the values are truncated to an integer. The encoded words were chosen such that
when M(J) = − PEAK, ICW(J) = 0
then M(J) = + PEAK, ICW(J) = 255
for ICW(J) from J = 1, . . . N.

Since the ICW(J) quantizing step values are calculated in decimal, they must be converted to binary before encoding sequentially in signal memory 13.

FIG. 7 is a table listing the binary encoded words corresponding to address words in the extreme left column. The address words and encoded words, which form the quantized amplitude samples, are listed in shorthand octal notation. Each digit in a three-digit octal word can be represented by three binary bits so that each octal word readily converts into a binary word. For example, the complete binary equivalent of address word $760_8$ is $111\ 110\ 000_2$ which is $496_{10}$ in decimal. For the encoded words which represent amplitude samples, the very first bit is always zero and therefore only eight binary bits are represented.

To generate the signal, the encoded words in store are scanned sequentially from word 0 to word N/2. The scanning period, SP, is thus $$SP = \frac{1}{NFO} = \frac{T}{N} = \frac{64\text{ms}}{1024} = 62.5\mu\text{sec}. \tag{57}$$

The encoded words are converted by converter 14 of FIG. 1 into a D.C. voltage V(J) where $$V(J) = \frac{ICW(J)}{255} = 10 \text{ volts}. \tag{58}$$

The output of converter 14 is a step-wise representation of the memory signal $M(t)$. After passing through filter 18, the line signal is precisely constructed.

Figure 8:
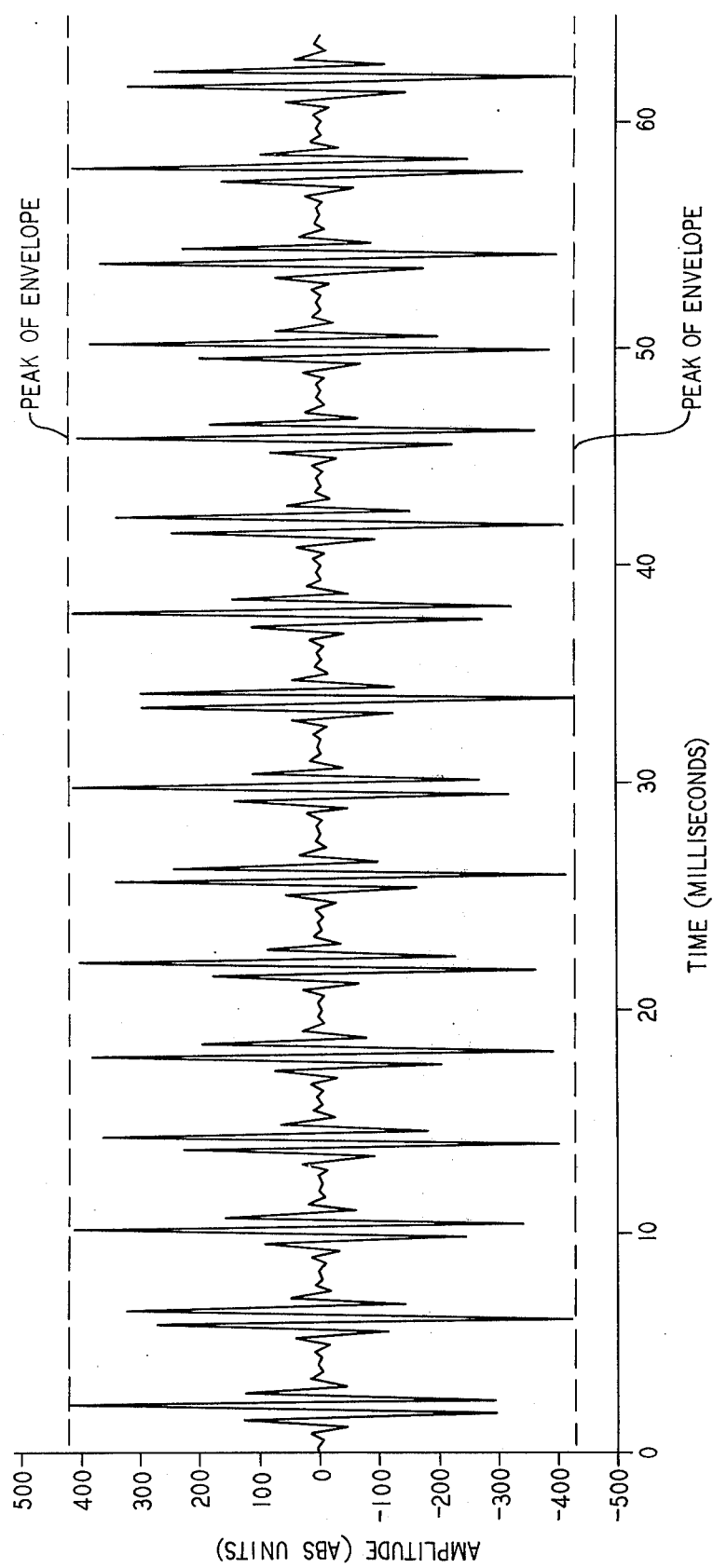
FIGS. 8 and 9 are waveform diagrams respectively illustrating no distortion and the effect of phase intercept distortion on the test signal applied to ratio circuit 26 of FIG. 1.

FIG. 8 depicts the waveform of the test signal in the time domain which has the frequency domain representation of the spectral cmponents listed in FIG. 5. The test signal comprises a sequence of 16 analog pulses which exhibit a characteristic called odd half-wave symmetry. In other words, the second half-wave of eight pulses would be symmetrical about the half-wave point to the first half-wave of eight pulses, but for a polarity reversal between the two half-waves. This characteristic is attributed to the frequency relationship between the spectral components. If the precise frequency offset of 15.625 Hz is subtracted from all the spectral components, each of the higher order spectral components is an odd multiple or harmonic of the fundamental spectral component 125 Hz. The absence of spectral components corresponding to even harmonics produces a pulse train that exhibits odd half-wave symmetry.

Since the test signal changes polarity every half-wave, the fact that nonlinear distortion may cause a deviation between the amplitude values of positive and negative pulses does not affect the P/AR measurement. Therefore, the influence of nonlinear distortion in a transmission channel, such as channel 21 of FIG. 1, is minimized. Thus, no ambiguity is produced in the P/AR measurement by reversals of the polarity in the connection between the P/AR signal generator and the transmission channel. Two other characteristics of the generated signal which help minimize the influence of harmonic distortion are that the leading edge of adjacent pulses within each half-wave are of opposite polarity and that the signal has a probability density function that has a zero mean value and a small standard deviation.

The other impairment referred to hereinbefore as phase intercept distortion will be described. Phase intercept is demonstrated by a plot of the phase shift versus frequency response for a linear hypothetical network. The value of phase intercept is determined by extrapolating the response curve down to zero frequency to intersect the phase axis. This process is described in the cited article by L. W. Campbell, Jr. In actual transmission networks, the exact value of phase intercept is much more difficult to determine. The phase characteristic $\theta(\omega)$ of an arbitrary network may be expressed as $$\theta(\omega) = \theta_1(\omega) + \phi \tag{59}$$

where $\phi$ is the network phase intercept. The envelope delay, $e(\omega)$, of the network is defined by $$e(\omega) = -d\theta(\omega)/d\omega = -d\theta_1(\omega)/d\omega. \tag{60}$$

Thus, Equation (60) shows that envelope delay is independent of phase intercept. Since the P/AR measurement is primarily sensitive to envelope delay, and envelope delay is independent of phase intercept, the P/AR measurement should have a high immunity to the effect of phase intercept.

The effect of non-zero phase intercept in the response of a channel is to add the phase intercept, $\phi$, to each spectral component of the transmitted signal. Since most signals contain a plurality of spectral components, the structure or shape of the signal is often altered substantially. The effect of phase intercept on the signal structure is known as phase intercept distortion. The primary effect of phase intercept distortion on the P/AR test signal is the reduction of its peak value which, of course, affects the ratio measurement.

The precise frequency offset is introduced to the baseband frequency domain of the generated signal to dominate any additional phase intercept distortion or frequency shift introduced during transmission. The precise frequency offset increases the phase of the fundamental spectrum of the generated signal linearly in time. Over one complete period, the phase of each spectral component increases by a multiple of $2\pi$ radians. The linearly varying phases changes the shape or structure of each pulse beneath the envelope of the signal. The value of the precise frequency offset was chosen so that the peak value of one of the pulses in the generated train of 16 pulses is substantially equal to the peak value of the envelope regardless of phase intercept distortion introduced by a typical transmission channel.

Figure 9:
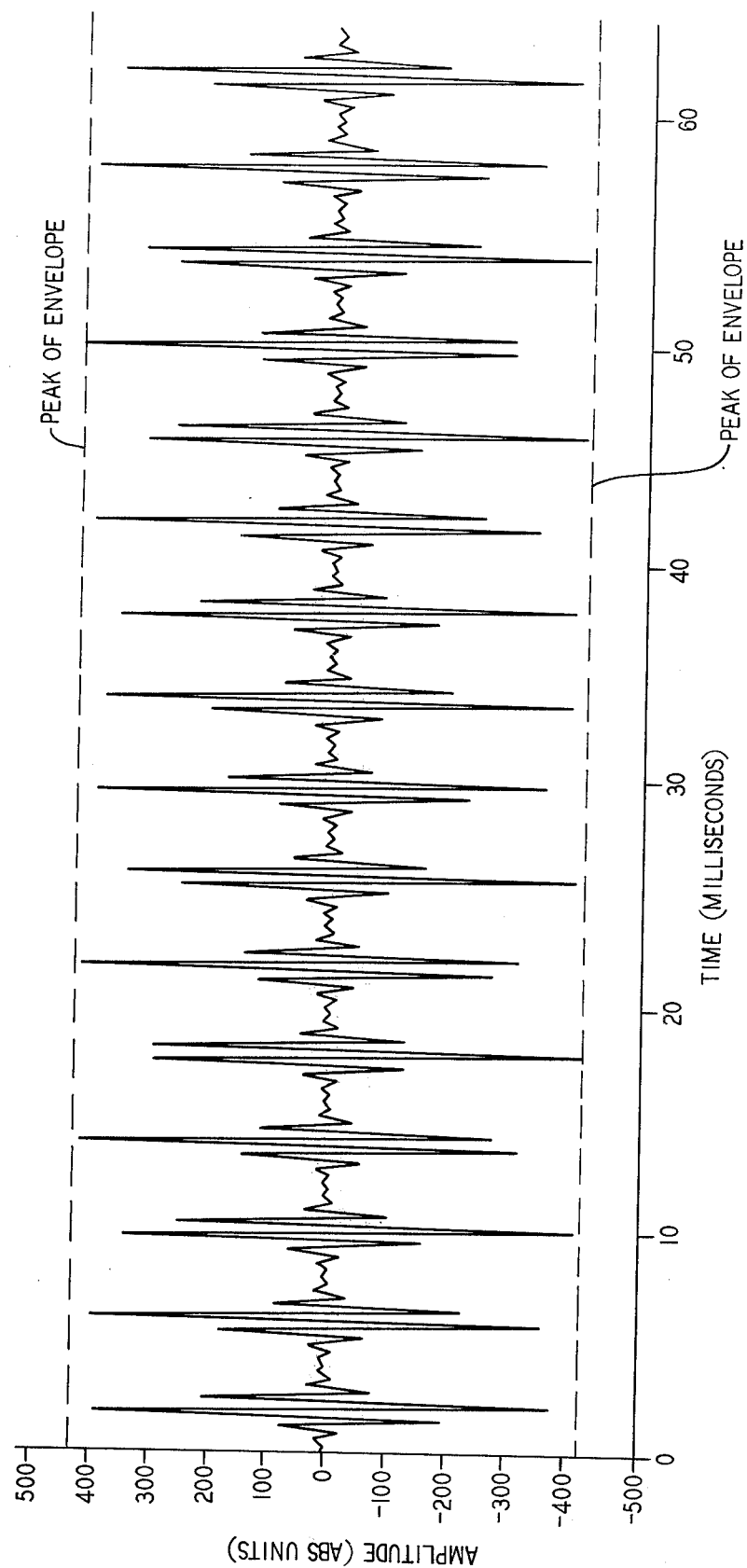
Figure 10:
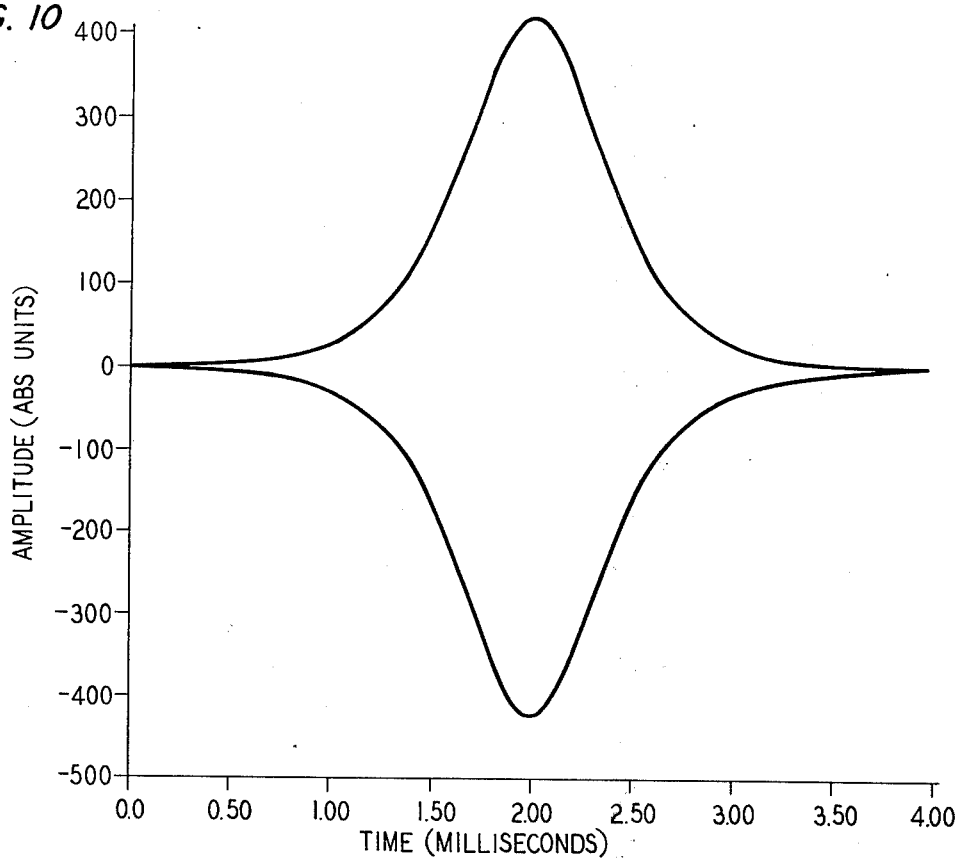
FIGS. 10 and 11 depict signal envelopes defined respectively by the test signals of FIGS. 8 and 9.
Figure 11:
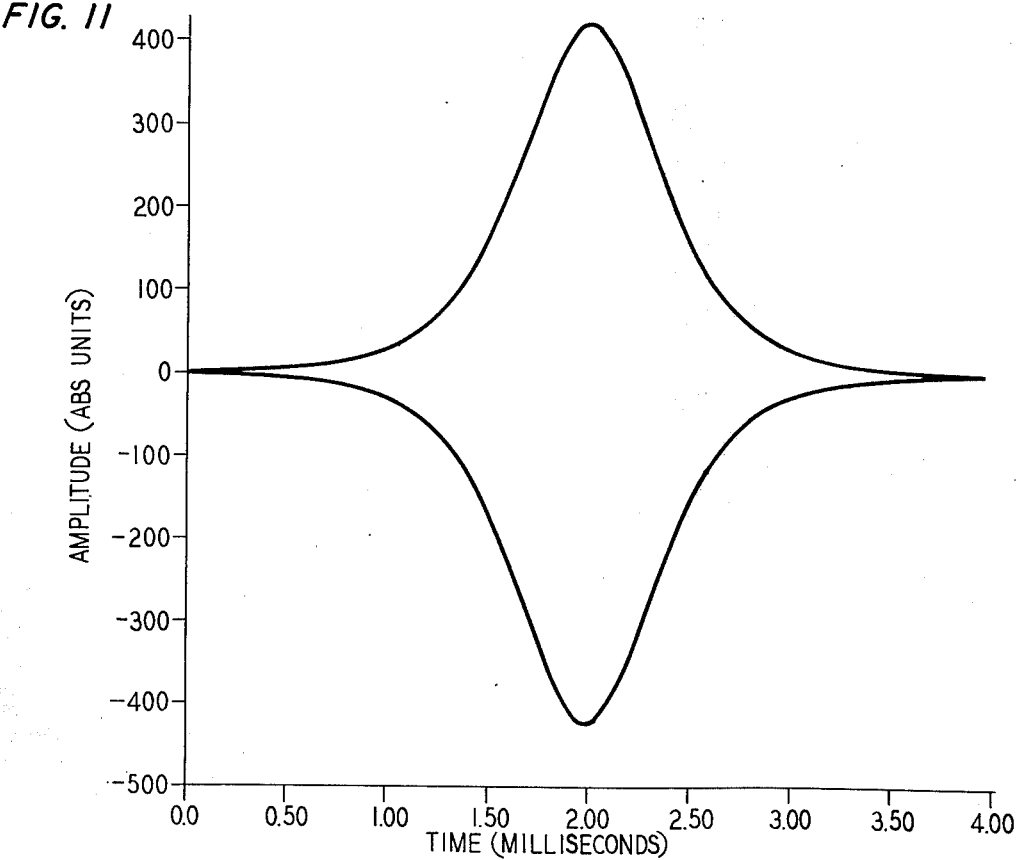

FIG. 9 illustrates the presence of $\pi/4$ radians of phase intercept distortion, which represents a worst case value, on the waveform depicted in FIG. 8. The dotted lines in FIGS. 8 and 9 correspond to the peak amplitude value of the envelope of the test signal. In each case, the internal peak detector included in ratio circuit 26 of FIG. 1 produces an output corresponding to the greatest peak value of the absolute value of the pulse train. The presence of the precise frequency offset insures that the greatest peak value essentially corresponds to the peak of the envelope. FIGS. 10 and 11 illustrate respectively the cumulative effect of the pulses in FIGS. 8 and 9. Over an interval of time, FIGS. 10 and 11 indicate the signal presented to the detectors of ratio circuit 26 of FIG. 1. Since the shape of envelope of FIGS. 10 and 11 are essentially identical, ratio circuit 26 of FIG. 1 will produce the same P/AR reading in each case even though the waveform of the individual pulses forming the composite of FIG. 11 are altered by a substantial amount of phase intercept distortion.

In summary, there are a number of criteria to be considered in the selection of the value of the precise frequency offset. The frequency of the precise frequency offset determines the amount of inaccuracy in the P/AR measurement when the test signal is affected by phase intercept distortion. Since the P/AR value ranges from zero to 100, an inaccuracy or error tolerance of less than one-half unit is not objective. The 15.625 Hz offset is the highest frequency that is rationally related to the fundamental spectral component of 125 Hz and satisfies the foregoing error tolerance objective in the P/AR value as determined by Equation (1). The rational relationship in the frequency domain introduces periodicity in the time domain of the generated signal. The periodicity simplifies the design of the apparatus which generates the signal. In addition, each spectral component is an odd number of times greater in frequency than the precise frequency offset which is consistent with the odd harmonic relationship in the frequency spectrum of the generated signal. Although a lower frequency value of offset will slightly increase the accuracy of the P/AR measurement, the number of encoding amplitude samples required to synthesize the signal increases substantially and necessitates a greater storage capacity within signal memory 13 in FIG. 1. Furthermore, a lower value of frequency offset than 15.625 Hz is more likely to be cancelled by the phase intercept distortion and frequency shift normally introduced during transmission.

Accordingly, it is to be understood that the arrangements described in the foregoing are merely an illustrative application of the principles of the present invention. Numerous and varied other arrangements may be utilized by those skilled in the art without departing from the spirit and scope of the invention.

What is claimed is:

1. Apparatus for generating a precisely controlled complex analog waveform comprising:
   means for defining a plurality of digital signals in the form of code groups constituting encoded samples of a pulse train having a fundamental spectral component and a plurality of higher order spectral components, said spectral components being each offset from a different nominal frequency by a prescribed frequency and defining a predetermined frequency spectrum, and said nominal frequencies being in harmonic relationship to each other,
   accessing means in predetermined circuit relationship with said means for defining for providing the code groups in a predetermined repetitive sequence, and
   converting means for decoding the digital signals in the code groups to form the pulse train whereby the prescribed frequency has a value that insures that the peak amplitude of at least one of the pulses of the pulse train essentially corresponds to the peak amplitude of the envelope of the pulse train independent of phase intercept distortion being subject to the pulse train.

2. Apparatus in accordance with claim 1 wherein said means for defining is further characterized by having digital signals in each code group indicative of selected amplitude values which minimize the effect of the presence of quantizing distortion in the pulse train.

3. Apparatus in accordance with claim 2 further comprising:
   filtering means for smoothing out the waveform of the pulse train produced by said converting means, and wherein said means for defining is further CHARACTERIZED IN THAT the digital signals are binary, and wherein said converting means comprises a plurality of gating means connected to receive the code groups provided by said accessing means, said gating means providing complementary code groups which are formed by binary digital signals that are the binary complements of the binary digital signals of the code groups of said means for defining, said gating means applying the complementary code groups to said converting means during alternate sequences of said accessing means, said converting means decoding each complementary code group to provide a voltage of the same magnitude but opposite in polarity to the voltage of each code group used to drive the complementary code group whereby the pulse train comprises selected analog pulses which would be symmetrical to the remaining pulses if not for the reversal in polarity.

4. Apparatus in accordance with claim 3 wherein the binary digital signals of said means for defining have selected amplitude values which are adjusted to compensate for aperture effect which is a distortion produced by the duration of each code group in the sequence provided by said accessing means and for phase and amplitude distortion produced by the transfer characteristic of said filtering means.

5. Apparatus in accordance with claim 4 wherein said converting means further comprises translating means having an output, said translating means decoding each code group and the complementary code group applied thereto into predetermined voltages having a single polarity and a direct current component and capacitive means connected to the output of said translating means for supplying the series of pulses produced by said converting means, and said capacitive means serving to remove the direct current component from the output of said translating means so as to produce pulses having opposite polarity.

6. Apparatus in accordance with claim 5 wherein the higher order spectral components are each offset from a nominal frequency which is an odd multiple of the nominal frequency that the fundamental spectral component is set off from and the prescribed frequency is a rational fraction of the nominal frequency near the fundamental spectral component whereby the rational fractional relationship serves to provide continuous and periodic signal properties in the pulse train.

* * * * *

UNITED STATES PATENT AND TRADEMARK OFFICE
CERTIFICATE OF CORRECTION

PATENT NO. : 3,952,189

DATED : April 20, 1976

INVENTOR(S) : Wayne N. Fabricius

It is certified that error appears in the above-identified patent and that said Letters Patent are hereby corrected as shown below:

Column 1, line 16, "arragements" should read --arrangements--. Column 5, line 34, "wich" should read --which--. Column 6, line 63, "As" should read --as--; line 65, "$s^2$", second occurrence, should read --$\hat{s}^2$--. Column 7, line 35, "$e^{j\prime}$" should read --$e^{j(}$--. Column 9, line 31, that portion of the equation reading $$= 20 \log M(\omega) = 10 \log (M^2(\omega)) .$$

should read $$= 20 \log M(\omega) = 10 \log (M^2(\omega)) .$$

Column 11, line 54, "$\overline{X}^2$" should read --$\overline{X^2}$--; and "$\overline{e}^2$" should read --$\overline{e^2}$--. Column 12, line 59, "$n_2 = d_2$ should read --$n_2 = n_1 = d_2$--; line 65, the equation number "(40)" should be separated from the equation. Column 13, line 37, the equation number "(44)" should be separated from the equation; line 40, " $=\omega_p$ " should read " $-\omega_p$ "; and "$P_2$, $P_{2=}$" should read --$P_2$, $P_{2*}$--; line 62, " $1 + (F(I)/F_p)^6$ " should read

UNITED STATES PATENT AND TRADEMARK OFFICE
CERTIFICATE OF CORRECTION

PATENT NO. : 3,952,189
DATED : April 20, 1976
INVENTOR(S) : Wayne N. Fabricius

It is certified that error appears in the above—identified patent and that said Letters Patent are hereby corrected as shown below:

-- $\sqrt{1 + (F(I)/F_p)^6}$ --; line 68, " $-\tan^1$ " should read -- $-\tan^{-1}$ --. Column 14, line 15, "ATS( )" should read --ATS(I)--; line 17, "FO/E(I)" should read --FO/F(I)--;

Signed and Sealed this

Twenty-eighth Day of September 1976

[SEAL]

Attest:

RUTH C. MASON
Attesting Officer

C. MARSHALL DANN
Commissioner of Patents and Trademarks